United States Patent
Mehrabanzad et al.

(10) Patent No.: US 7,801,487 B2
(45) Date of Patent: Sep. 21, 2010

(54) DETECTION OF RADIO FREQUENCY INTERFERENCE IN WIRELESS COMMUNICATION SYSTEMS

(75) Inventors: Sepehr Mehrabanzad, Southborough, MA (US); Satish Ananthaiyer, Tewksbury, MA (US); Pierre A. Humblet, Cambridge, MA (US)

(73) Assignee: Airvana, Inc., Chelmsford, MA (US)

( * ) Notice: Subject to any disclaimer, the term of this patent is extended or adjusted under 35 U.S.C. 154(b) by 1204 days.

(21) Appl. No.: 11/321,903

(22) Filed: Dec. 29, 2005

(65) Prior Publication Data

US 2007/0155329 A1 Jul. 5, 2007

(51) Int. Cl.
*H04B 1/00* (2006.01)
(52) U.S. Cl. .............. 455/63.1; 455/114.2; 455/522; 455/278.1; 370/328; 370/252
(58) Field of Classification Search .............. 455/63.11, 455/114.2, 522, 278.1, 296, 13.4, 127.1, 455/67.11; 370/328, 252
See application file for complete search history.

(56) References Cited

U.S. PATENT DOCUMENTS

| | | | |
|---|---|---|---|
| 6,032,041 A * | 2/2000 | Wainfan et al. | 455/427 |
| 6,226,533 B1 * | 5/2001 | Akahane | 455/566 |
| 6,339,707 B1 * | 1/2002 | Wainfan et al. | 455/427 |
| 6,347,224 B1 * | 2/2002 | Smyth et al. | 455/406 |
| 6,690,929 B1 * | 2/2004 | Yeh | 455/406 |
| 6,708,029 B2 * | 3/2004 | Wesel | 455/428 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,760,311 B1 * | 7/2004 | Raith | 370/252 |
| 6,781,999 B2 | 8/2004 | Eyuboglu et al. | |
| 7,020,462 B1 * | 3/2006 | Wesel | 455/427 |

(Continued)

FOREIGN PATENT DOCUMENTS

GB 2452688 3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner*—Minh D Dao
(74) *Attorney, Agent, or Firm*—Fish & Richardson P.C.

(57) ABSTRACT

A device causes at least one access terminal that is configured to transmit data to a radio node in a sector of a radio access network to alter transmission. While transmission is altered, the device determines a power of a signal received at the radio node, and updates an average value of signal power using the power measured. A device receives, from one or more access terminals that are configured to receive data from a radio node in a sector of a radio access network, a requested rate at which information should be transmitted to each access terminal, receives from the access terminals information about quality of signals received from the radio node, and generates an event if the requested rate and the information about quality of signals fail to satisfy a condition. An access terminal, located in the vicinity of a first radio node configured to transmit data in a sector of a radio access network, measures signal power of pilot signals received by the access terminal.

18 Claims, 5 Drawing Sheets

U.S. PATENT DOCUMENTS

| | | | |
|---|---|---|---|
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,299,278 | B2 | 11/2007 | Ch'ng |
| 7,324,056 | B2 * | 1/2008 | Wesel .......................... 343/766 |
| 7,373,163 | B2 * | 5/2008 | Kim et al. ................... 455/522 |
| 7,457,628 | B2 * | 11/2008 | Blumberg et al. ........ 455/456.1 |
| 7,480,269 | B2 * | 1/2009 | Heo et al. ................... 370/328 |
| 7,558,356 | B2 | 7/2009 | Pollman et al. |
| 7,558,588 | B2 | 7/2009 | To et al. |
| 2002/0196749 | A1 | 12/2002 | Eyuboglu et al. |
| 2003/0100311 | A1 | 5/2003 | Chung et al. |
| 2003/0207684 | A1 * | 11/2003 | Wesel .......................... 455/427 |
| 2004/0160901 | A1 * | 8/2004 | Raith .......................... 370/252 |
| 2004/0162101 | A1 * | 8/2004 | Kim et al. ................... 455/522 |
| 2005/0213555 | A1 | 9/2005 | Eyuboglu et al. |
| 2005/0243749 | A1 | 11/2005 | Mehrabanzad et al. |
| 2005/0245279 | A1 | 11/2005 | Mehrabanzad et al. |
| 2006/0067422 | A1 | 3/2006 | Chung |
| 2006/0067451 | A1 | 3/2006 | Pollman et al. |
| 2006/0126509 | A1 | 6/2006 | Abi-Nassif |
| 2006/0159045 | A1 | 7/2006 | Ananthaiyer et al. |
| 2006/0240782 | A1 | 10/2006 | Pollman et al. |
| 2006/0291420 | A1 | 12/2006 | Ng |
| 2006/0294241 | A1 | 12/2006 | Cherian et al. |
| 2007/0026884 | A1 | 2/2007 | Rao |
| 2007/0037523 | A1 * | 2/2007 | Bi et al. .......................... 455/69 |
| 2007/0058628 | A1 | 3/2007 | Rao et al. |
| 2007/0060138 | A1 * | 3/2007 | Kwak et al. ................. 455/445 |
| 2007/0077948 | A1 | 4/2007 | Sharma et al. |
| 2007/0097916 | A1 | 5/2007 | Eyuboglu et al. |
| 2007/0115896 | A1 | 5/2007 | To et al. |
| 2007/0140172 | A1 | 6/2007 | Garg et al. |
| 2007/0140184 | A1 | 6/2007 | Garg et al. |
| 2007/0140185 | A1 | 6/2007 | Garg et al. |
| 2007/0140218 | A1 | 6/2007 | Nair et al. |
| 2007/0155329 | A1 | 7/2007 | Mehrabanzad et al. |
| 2007/0220573 | A1 | 9/2007 | Chiussi et al. |
| 2007/0230419 | A1 | 10/2007 | Raman et al. |
| 2007/0238442 | A1 | 10/2007 | Mate et al. |
| 2007/0238476 | A1 | 10/2007 | Raman et al. |
| 2007/0242648 | A1 | 10/2007 | Garg et al. |
| 2007/0248042 | A1 | 10/2007 | Harikumar et al. |
| 2008/0003988 | A1 | 1/2008 | Richardson |
| 2008/0013488 | A1 | 1/2008 | Garg et al. |
| 2008/0062925 | A1 | 3/2008 | Mate et al. |
| 2008/0065752 | A1 | 3/2008 | Ch'ng et al. |
| 2008/0069020 | A1 | 3/2008 | Richardson |
| 2008/0069028 | A1 | 3/2008 | Richardson |
| 2008/0076398 | A1 | 3/2008 | Mate et al. |
| 2008/0117842 | A1 | 5/2008 | Rao |
| 2008/0119172 | A1 | 5/2008 | Rao et al. |
| 2008/0120417 | A1 | 5/2008 | Harikumar et al. |
| 2008/0139203 | A1 | 6/2008 | Ng et al. |
| 2008/0146232 | A1 | 6/2008 | Knisely |
| 2008/0151843 | A1 | 6/2008 | Valmikam et al. |
| 2008/0159236 | A1 | 7/2008 | Ch'ng et al. |
| 2008/0162924 | A1 | 7/2008 | Chinitz et al. |
| 2008/0162926 | A1 | 7/2008 | Xiong et al. |
| 2008/0253550 | A1 | 10/2008 | Ch'ng et al. |
| 2008/0254792 | A1 | 10/2008 | Ch'ng |
| 2009/0034440 | A1 | 2/2009 | Samar et al. |
| 2009/0036747 | A1 * | 2/2009 | Hayter et al. ................ 600/300 |
| 2009/0082020 | A1 | 3/2009 | Ch'ng et al. |
| 2009/0088155 | A1 | 4/2009 | Kim |
| 2009/0116445 | A1 | 5/2009 | Samar et al. |
| 2009/0154447 | A1 | 6/2009 | Humblet |
| 2009/0156165 | A1 | 6/2009 | Raghothaman et al. |
| 2009/0156195 | A1 | 6/2009 | Humblet |
| 2009/0156218 | A1 | 6/2009 | Garg et al. |
| 2009/0163202 | A1 | 6/2009 | Humblet et al. |
| 2009/0163216 | A1 | 6/2009 | Hoang et al. |
| 2009/0163228 | A1 * | 6/2009 | Blumberg et al. ........ 455/456.3 |
| 2009/0163238 | A1 | 6/2009 | Rao et al. |
| 2009/0164547 | A1 | 6/2009 | Ch'ng et al. |
| 2009/0168766 | A1 | 7/2009 | Eyuboglu et al. |
| 2009/0168788 | A1 | 7/2009 | Den et al. |
| 2009/0170440 | A1 | 7/2009 | Eyuboglu et al. |
| 2009/0170475 | A1 | 7/2009 | Ch'ng et al. |
| 2009/0170520 | A1 | 7/2009 | Jones |
| 2009/0170547 | A1 | 7/2009 | Raghothaman et al. |
| 2009/0172169 | A1 | 7/2009 | Ch'Ng et al. |
| 2009/0172397 | A1 | 7/2009 | Kim |
| 2009/0186626 | A1 | 7/2009 | Raghothaman et al. |
| 2009/0259118 | A1 * | 10/2009 | Feldman et al. ............. 600/345 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024, version 4, Oct. 25, 2002 (548 pages). (supersedes Feb. 2001 version).

3rd Generation Partnership Project 2 "3GPP2", "cdma2000 High Rate Packet Data Interface Specification", C.S0024-A, version 1, Mar. 2004 (1083 pages).

3rd Generation Partnership Project 2 "3GPP2", "cdma2000 Wireless IP Network Standard", P.S0001-B, version2, Sep. 2004 (111 pages-)(supersedes May 2001 version).

3rd Generation Partnership Project 2 "3GPP2", "Inter-Operability Specification (IOS) for High Rate Packet Data (HRPD) Access Network Interfaces", A.S0007-0, version 2, Nov. 2001 (118 pages).

3rd Generation Partnership Project 2 "3GPP2", "Interoperability Specification (IOS) for High Rate Packet Data (HRPD) Access Network Interfaces", A.S0008-0, version 3, May 2003 (126 pages).

RIP-2 MD5 Authentication, RFC 2082, Jan. 1997 (13 pages).

3rd Generation Partnership Project 2 "3GPP2", "Interoperability Specification (IOS) for CDMA2000 Access Network Interfaces", A.S0011-0, version 1, Nov. 16, 2001 (23 pages).

Simple Network Time Protocol (SNTP), RFC 1769, Mar. 1995 (14 pages).

3rd Generation Partnership Project 2 "3GPP2", "Recommended Minimum Performance Standards for cdma2000 High Rate Packet Data Access Network", C.S0032-0, version 2, Dec. 12, 2003, (141 pages)(supersedes Dec. 8, 2000 version)(141 pages).

VoIP over 1xEV-DO, presented by Airvana at the CDG Technology Forum on VoIP, CDG Technology Forum on VoIP, Nov. 5, 2005 (23 pages).

* cited by examiner

DETECTION OF RADIO FREQUENCY INTERFERENCE IN WIRELESS COMMUNICATION SYSTEMS

TECHNICAL FIELD

This invention relates to detection of radio frequency interference in wireless communication systems.

BACKGROUND

Cellular wireless communications systems are designed to serve many access terminals distributed in a large geographic area by dividing the area into cells. At the center of each cell, a radio node is located to serve access terminals (e.g., cellular telephones, laptops, PDAs) located in the cell. In some cases access terminals may route traffic from additional sources, for example a single access terminal on board an aircraft may relay data from other on-board devices to a radio node on the ground. Each cell is often further divided into sectors by using multiple sectorized antennas (the term "sector" is used both conventionally and in this document, however, even when there is only one sector per cell). In each cell, a radio node serves one or more sectors and communicates with multiple access terminals in its cell. A radio node can generally support a certain amount of traffic in each sector for a particular bandwidth, and this amount is reduced by the presence of other signals in the same frequency range or carrier. It is often desirable to monitor the level of interference in a sector in order to ensure that the interference is not overwhelming the traffic.

SUMMARY

In general, in one aspect, a device causes at least one access terminal that is configured to transmit data to a radio node in a sector of a radio access network to alter transmission. While transmission is altered, the device determines a power of a signal received at the radio node, and updates an average value of signal power using the power measured.

Implementations may include one or more of the following features. Generating an event based on the updated average value. The event is generated depending on the relationship between the updated average value and a threshold value. The threshold value comprises a sum of a configurable value and a value that is a floor of a noise level. The noise floor value is based on parameters associated with operation of the radio node. Generating an alarm on a management system if an event is generated. Informing an operator that interference is present if an event is generated. The altering is caused at intervals. The altering comprises stopping transmission. The transmission is altered for a pre-defined period of time each time it is curtailed. The average value comprises the average of powers measured during previous intervals.

In general, in one aspect, a device receives, from one or more access terminals that are configured to receive data from a radio node in a sector of a radio access network, a requested rate at which information should be transmitted to each access terminal, receives from the access terminals information about a quality of signals received from the radio node, and generates an event if the requested rate and the information about quality of signals fail to satisfy a condition.

Implementations may include one or more of the following features. Updating an average requested rate with the requested rate received from each access terminal. The rate is received at regular intervals. The information is received at regular intervals. The average rate for each access terminal comprises the average of rates received from the access terminal during previous intervals. The condition is that the average requested rate has a particular relationship to a threshold rate for each access terminal. The information is used to compute a distance between the radio node and each access terminal. The information about signals describes a delay in transmission of signals between the radio node and each access terminal. The information about signals describes a phase shift in transmission of signals between the radio node and each access terminal. The information about a quality of signals is used to compute a distance between the radio node and each access terminal, and the threshold value for each access terminal is determined by the computed distance. The information about signals includes signal power of a pilot signal transmitted by the radio node and received by each access terminal. The threshold value for each access terminal is determined by the signal power of the pilot signal received by the access terminal. If the distance between the radio node and any of the access terminals is small, not including information about that access terminal in the comparison.

In general, in one aspect, an access terminal, located in the vicinity of a first radio node configured to transmit data in a sector of a radio access network, measures signal power of pilot signals received by the access terminal.

Implementations may include one or more of the following features. Information about the measured power is communicated to a radio network controller in response to a request received from the radio network controller. Additional requests are received from the radio network controller at intervals. A radio network controller computes a signal-to-noise ratio of the signal power of the pilot signal transmitted by the first radio node and generates an event based on the computed signal to noise ratio. Updating an average value of the signal to noise ratio with the computed signal-to-noise ratio, and generating the event based on the updated average value. The average value of the signal-to-noise ratio is the average of signal-to-noise ratios computed during previous intervals. The event is generated depending on the relationship between the updated average value and a threshold value. Measuring at the access terminal signal power of one or more second pilot signals transmitted by one or more second radio nodes and received by the access terminal, and communicating information about the signal power of the second pilot signals to a radio network controller in response to the request. An average value of the signal-to-noise ratio is computed including the signal power of the second pilot signals. The radio network controller generates an event if the access terminal does not respond to the request. Generating alarms on a management system if an event is generated. The access terminal is located to yield a high likelihood that any signals from the radio node to the access terminal are not obstructed. The access terminal is stationary relative to the radio node.

Among the advantages of the invention are one or more of the following. Access terminals, radio nodes, or radio network controllers are able to detect in-band radio frequency interference in the forward-link. Access terminals, radio nodes, or radio network controllers are able to detect in-band radio frequency interference in the reverse-link.

Other general aspects include other combinations of the aspects and features described above and other aspects and features expressed as methods, apparatus, systems, program products, and in other ways.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
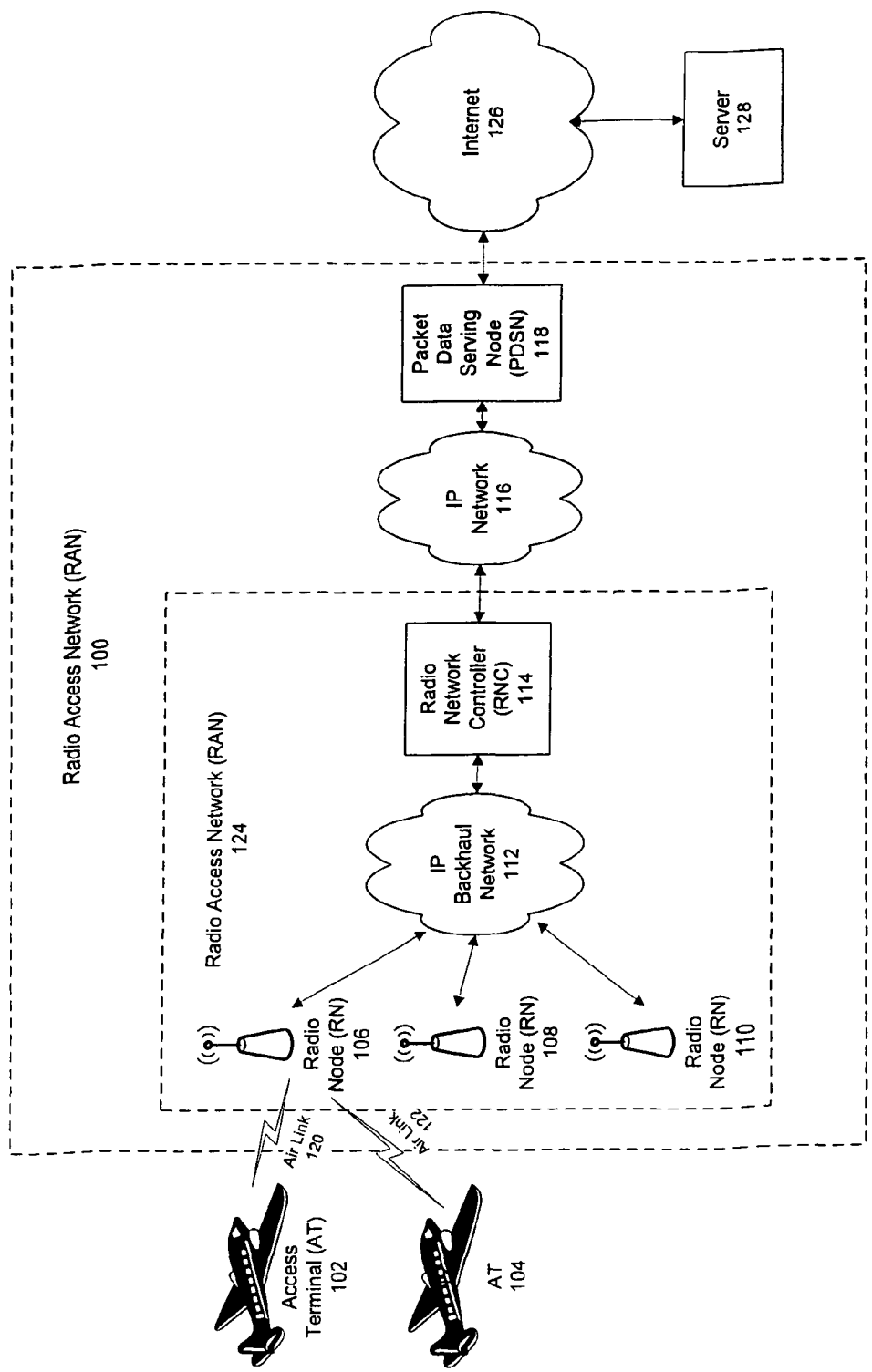
FIG. 1 is a block diagram of a radio access network.

Referring to FIG. 1, a radio access network (RAN) 100 uses the CDMA2000 Evolution Data-Optimized (1×EV-DO) protocol to transmit data packets between an access terminal (AT), e.g. access terminal 102 and 104, illustratively located on board respective aircrafts, and an external network such as the Internet 126. The 1×EV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference.

The radio access network (RAN) 100, which may cover a large service area, includes one or more sub-networks, e.g., RAN 124, each anchored by a Radio Network Controller (RNC), e.g., RNC 114, communicating with several radio nodes (RN) 106, 108, 110 using a private or public IP backhaul network 112. Each radio node may support one or multiple sectors, such as the one, three, or six sector cells shown in FIG. 2, with each sector covering a certain cell area around corresponding radio nodes 106, 108, 110, 130, 132.

The radio access network 124 is connected over a public or private IP network 116 to one or more Packet Data Serving Nodes (PDSNs), e.g., PDSN 118. The PDSN, in turn, receives and transmits data packets (e.g., voice over IP, web pages, images, email) to a server 128 via the Internet 126. In some implementations, the functions of an RN and an RNC are combined into a single device, also in some implementations the functions of a PDSN and an RNC are combined into a single device. In additions in some implementations functions of an RN, RNC, and PDSN are combined into a single device. The ideas in this disclosure are independent of the above combinations and the benefits apply equally.

Each access terminal, e.g. access terminal 102, 104, is in communication with a radio node, e.g., radio node 106, 108, 110, via an air link, e.g., 120, 122. An air link comprises a forward link (also referred to as a downlink), which carries data transmitted from a radio node to an access terminal, and a reverse link (also referred to as an uplink), which carries data transmitted from the access terminal to the radio node.

Figure 2:
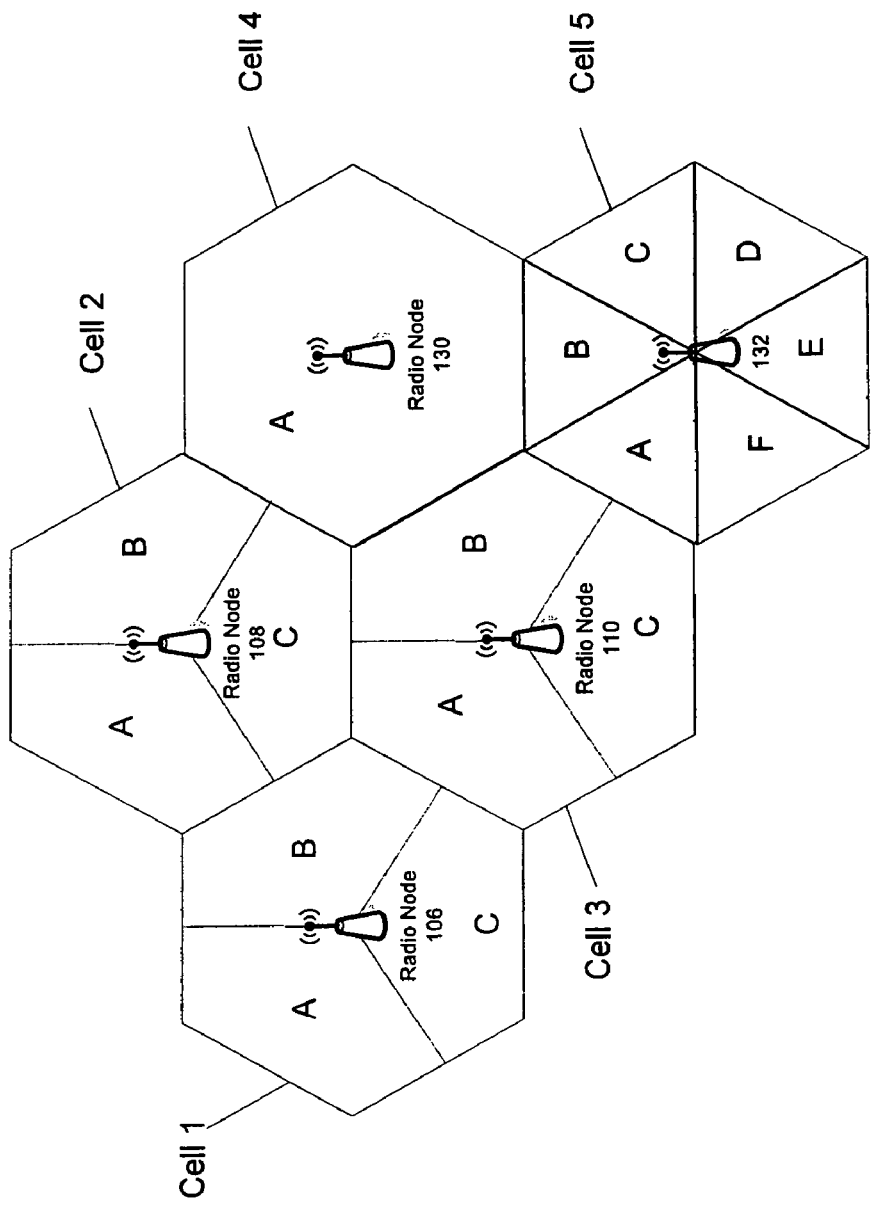
FIG. 2 shows sectors of a radio access network.

As shown in FIG. 2, a geographic area covered by radio access network 100 (shown in FIG. 1) is divided into multiple cells, e.g., cells 1-5, which are each further divided into sectors. Cells 1-3 are divided into three sectors, A, B, and C, while cell 4 has only one sector, A, and cell 6 has six sectors, A-F. Each cell includes a radio node 106, 108, 110, 130, 132 that communicates with access terminals (e.g., those on board aircraft) (not shown) located within each radio node's cell. Each radio node uses a directional antenna (not shown) appropriately positioned in each sector to send data to and receive data from access terminals located in the sectors.

Radio frequency (RF) energy other than communication signals received by the antenna of a radio node is referred to as thermal noise, and may include RF energy from natural sources or radiated interference from other devices such as cellular telephones, other communications networks, or household appliances. RF energy in the same frequency band as that used for communications within the RAN is referred to as in-band interference. Once a baseline amount of thermal noise in an environment has been determined, the ratio of total received RF energy to the baseline amount is referred to as a Rise-Over-Thermal, or ROT.

Figure 3A:
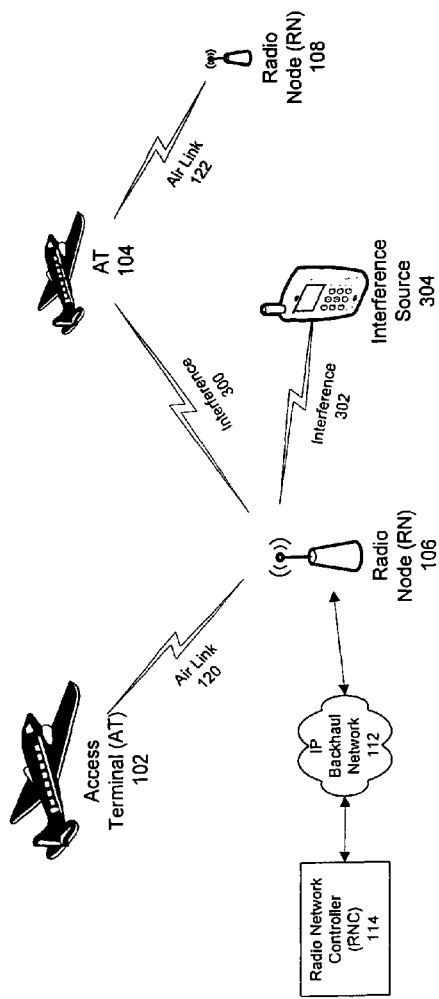
FIG. 3A is an illustration of a typical usage situation.

FIG. 3A shows a typical scenario for a 1×EV-DO network servicing access terminals on board aircraft. Access terminal 102 is in communication with radio node 106 via air link 120. Access terminal 104 is in communication with radio node 108 via air link 122. Access terminal 104 produces signals that are received by radio node 106. If access terminal 104 is not also in communication with radio node 106, for example in a soft handoff between the radio nodes, these signals are regarded as in-band interference. Interference source 304 may also produce signals that are received by radio node 106, for example transmissions from an unrelated cellular device or an unlicensed radio. In some cases, interference is caused by radio transmissions from radios that are not operating according to their respective specifications, for example, out of their assigned bands. Interference source 304 can be a microwave oven, a cellular telephone, or one of a number of other sources of radio frequency interference. If that interference is in the same frequency range as the signals used for air link 120, it will be in-band interference and may degrade the quality of communications over air link 120. Each of air link 120 and in-band interference signals 300, 304 contribute to the ROT measured at radio node 106 when it is tuned to the frequency band used for air link 120. Radio node 106 is controlled by RNC 114 over network 112. This in-band interference in the reverse link, i.e., communication from an access terminal to a radio node, can be detected by monitoring the ROT.

Figure 3B:
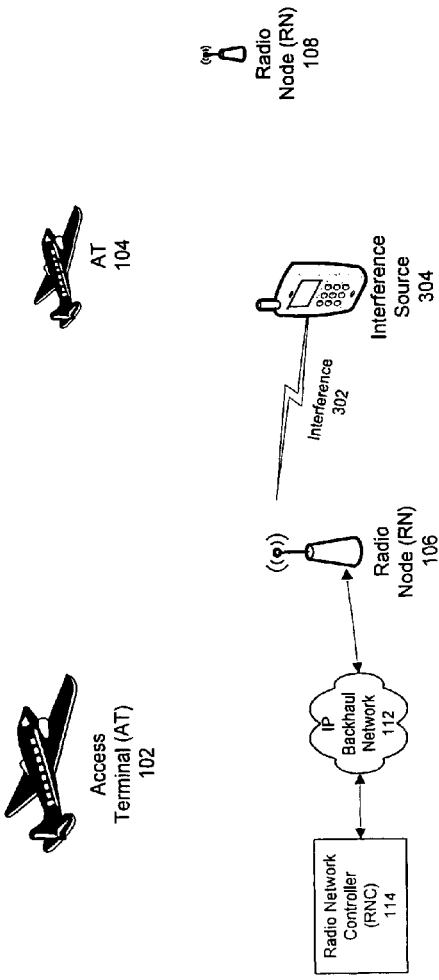
FIG. 3B is an illustration of a quiet period.

The EV-DO protocol provides a capability for an RAN to instruct all access terminals in the network to simultaneously enter a quiet period, in which the access terminals in the network cease transmission for a certain period of time based on network broadcast parameters. During such a quiet period, the radio node can measure the total power received by the antenna of the sector to determine the ROT present in its environment in the absence of the signals it is configured to receive. As shown in FIG. 3B, access terminals 102 and 104 enter the quiet period and stop transmitting any signals. Radio node 106 may still receive signals from other sources not governed by the RAN, which to radio node 106 are in-band interference. Radio node 106 may also receive in-band interference from other sources, e.g. interference source 304. Radio node 106 measures the ROT detected and reports this back to RNC 114 over network 112. Radio node 106 may also measure total power received and report that back to RNC 114. By recording ROT or total power detected by radio node 106 during successive quiet periods, radio node 106 may establish an average ROT or total power, and can update this average each time a new measurement is reported. The radio node can be configured with a pre-determined threshold, and, by comparing the average to that threshold, radio node 106 can detect the presence of interference sources and take appropriate steps, such as informing a network operator of the situation. In one example, the threshold is expressed as $T=Nf+\Delta$, where Nf is a noise figure for the radio node and the antenna and is known based on the design of the receiver. The noise figure can be the sum of the noise that might be introduced into the receiver by its various components, or it can be any other value suitable for a particular application. The configurable value Δ will be a function of the RAN deployment. If the total power is greater than threshold T, which is configurable per sector, that indicates that the total power is an amount Δ greater than the noise floor Nf of the receiver. If Δ is the amount of noise that constitutes unacceptable interference, then an event will be generated whenever total power crosses threshold T. The appropriate alarms can be raised to alert the network operator to the unacceptable level of interference in the reverse link and to take appropriate further action.

In-band interference detection in the forward link, i.e., in communication from a radio node to an access terminal, can be detected by the radio node by analyzing the control communications between the access terminals, the RNC, and itself. One signal the access terminal transmits to the radio node is referred to as Data Rate Control, DRC. The DRC signal communicates to the RAN the rate at which the access terminal desires to receive data (DRC rate) and which radio node to transmit from on the forward link (DRC cover). This rate should be proportional to the strength of the signals the access terminal is receiving from the radio node and inversely proportional to the square of the distance between the access terminal and the radio node.

Distance, i.e., one-way delay from the access terminal to the radio node, can be determined at the radio node by a reverse link acquisition and tracking loop, which is well known in the art. Alternatively, signal strength and distance information can be determined at the RNC from the route update message, another signal sent from the access terminal to the RNC. The route update message is sent regularly and includes the strength, time delay, and phase offset (PN-offset) of the pilot signal received by the access terminal.

Figure 4:
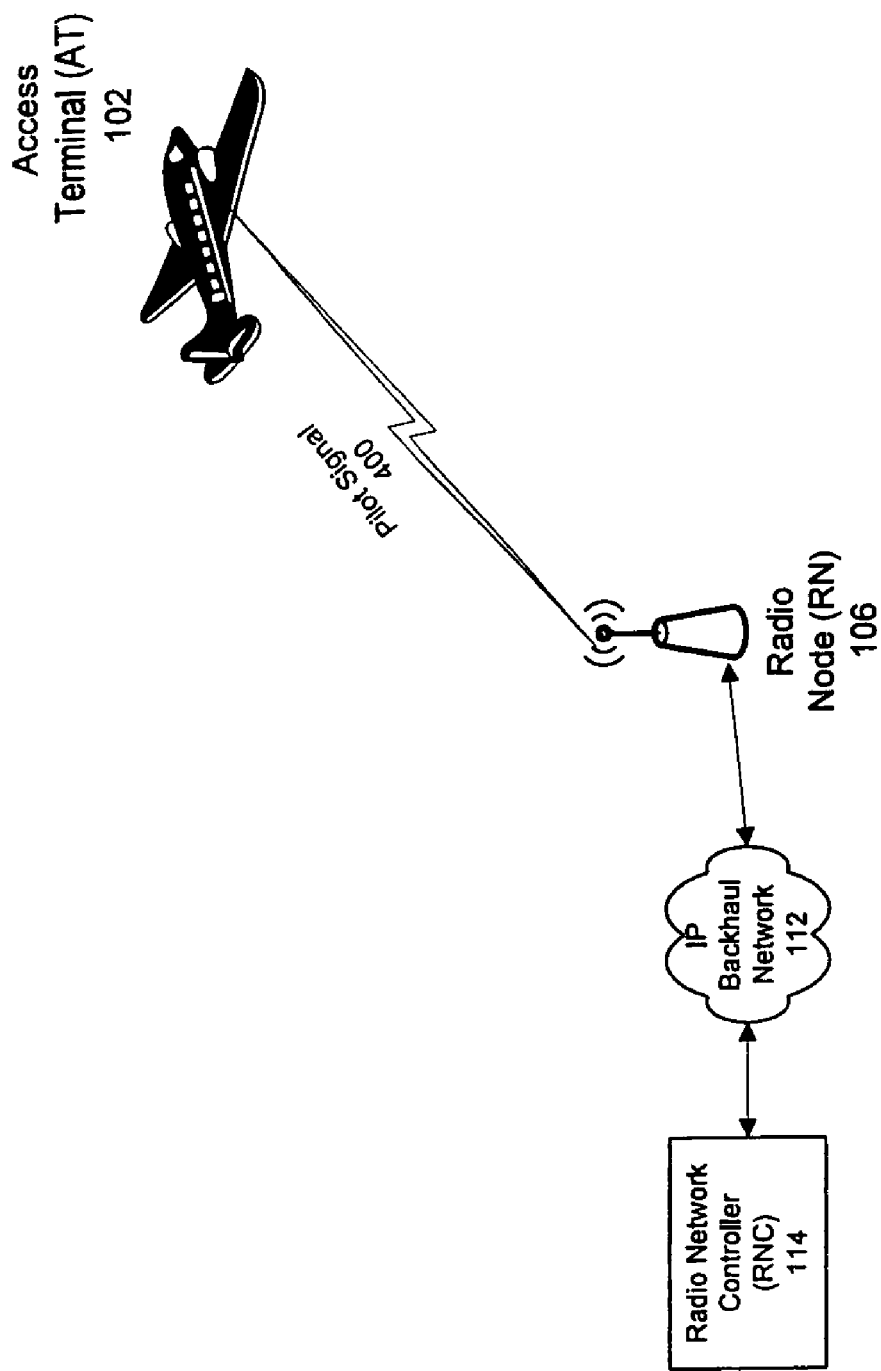
FIG. 4 is an illustration of a method for determining the distance to the access terminal.

In some examples, the distance from a radio node to an access terminal on board an aircraft can be determined at the RNC as illustrated in FIG. 4. The phase offset of all received pilot signals relative to a reference pilot signal is reported to RNC 114 by the access terminal in the route update message as prescribed in the EV-DO protocol. Access terminal 102 can determine the distance to radio node 106 by measuring the phase offset in the received pilot-signal 400's PN-offset, which is well known technique in the art in CDMA based wireless systems. Based on this distance, RNC 114 or radio node 106 determines what data rate is expected from the DRC signal (not shown).

Any in-band interference on the forward link will upset the proportionalities between the requested rate verses the signal strength or distance and can therefore be detected. This method for detecting in-band interference can be used in airborne applications because the line-of-sight RF path from the aircraft to the radio node has no shadowing and multi-path effects, which otherwise could complicate measuring distance and power. If this expected rate differs from the actual rate requested by the access terminal by a threshold amount, the RNC or radio node concludes that interference is present in the forward link (degrading the requested rate) and takes appropriate action, as discussed above in the reverse link case.

Although the above example uses the phase shift of the pilot signal's PN-sequence, the time delay of the pilot signal or other attributes of the pilot signal or other signals from the radio node to the access terminal can also be used to measure the distance of the access terminal from the radio node. Likewise, the signal strength of the pilot signal or other signals from the radio node can be used in place of the distance to determine the expected data rate. In addition, reverse-link signals from the access terminal to the radio node can be used, and the corresponding measurement of signal delay, phase, power or other attributes can be made at the radio node. In some examples, the computation of distance can be performed at either or both of the access terminal and the radio node, and then reported directly to the RNC or any other suitable location.

If multiple access terminals are in communication with a single radio node, the data rate (assuming the access terminal is not in a fixed rate mode) and distance relationship for each access terminal individually may be used to detect in-band interference, such that interference is assumed if any one of the access terminals requests a data rate that crosses the corresponding threshold for that access terminal's distance from the radio node. This is advantageous when the interference transmission is directional and can only be seen by access terminals in the path of interference.

In another example, when multiple airborne access terminals are in use, the signals from aircraft near the ground will reveal extremely small distances and can be ignored in determining whether any in-band interference is present.

Figure 5:
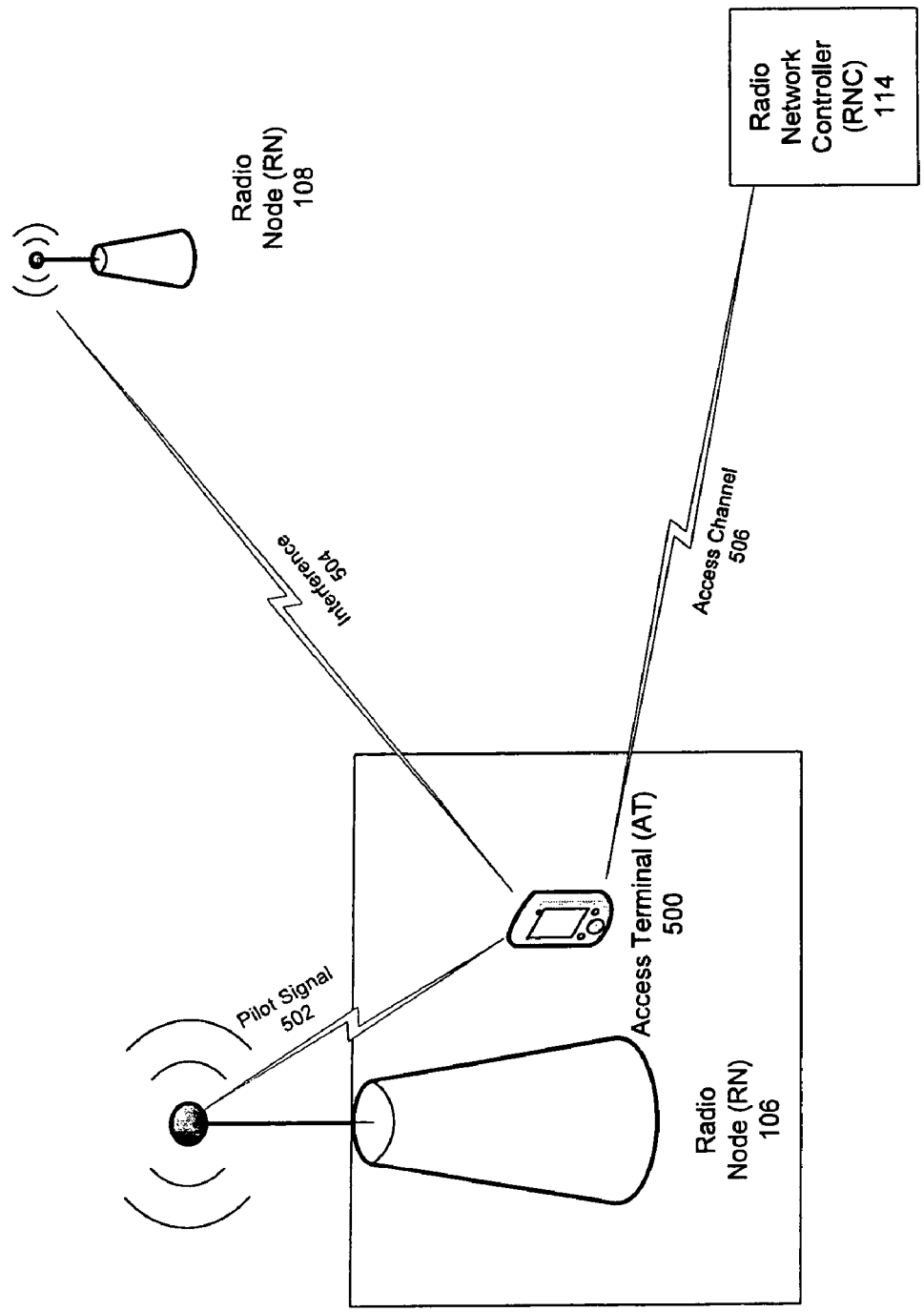
FIG. 5 is an illustration of an alternative interference detection method.

If a line-of-sight path is not available between the radio node and the access terminals, or either is not using a directional antenna, the signal strength to distance relationship may not reveal the presence of in-band interference on the forward link, for example, due to the presence of RF-reflecting or absorbing obstacles between the access terminals and the radio node. Having a stationary access terminal is one solution to this situation, as illustrated in FIG. 5. An access terminal 500 is placed at the site of the radio node 106. When instructed by the RNC 114 e.g., using a Route Update Reset message in the EV-DO protocol, access terminal 500 measures the strength of pilot signal 502 from radio node 106 as well as the strength of any pilot signals 504 received from remote radio nodes, e.g. 108. Access terminal 500 reports the signal to noise ratio (SNR) of the pilot signal 502 from radio node 106 to the RNC 114 using an access channel 506 as prescribed in EV-DO protocol. RNC 114 or radio node 106 can then compare this measured SNR to that measured on previous occasions to determine whether in-band interference sources are present on the forward link, since SNR would decrease as interferences increases. Since access terminal 500 does not have a traffic channel to radio node 106, in the case of EV-DO, but is still measuring signals received from radio node 106 and other neighboring radio nodes, and it communicates with RNC 114 and radio node 106 over the access channel 506, it has a minimal impact on the capacity of the spectrum that is used for traffic channel communication with commercial access terminals. If in-band interference signal 504 is too strong, access terminal 500 may not receive instructions from RNC 114 or may be unable to transmit its measurements, in which case RNC 114 or radio node 106 can regard access terminal 500's failure to respond as in indication of in-band interference and react appropriately. To assure that the RNC is correct in attributing the failure to respond to in-band interference and not to a non-functional access terminal, the access terminal can be configured to transmit a periodic message which indicates that it is operational. For example, this can be achieved by the Session Keep Alive message in the EV-DO protocol.

Although the techniques described above employ the 1×EV-DO air interface standard, the techniques are also applicable to other CDMA and non-CDMA air interface technologies. Although the techniques above have been described with reference to an example in which access terminals are located on board aircraft, the techniques are also applicable to terrestrial examples.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, the computations described can be performed at a radio node, at a radio network controller, or at another element of a radio access network. Accordingly, other embodiments are within the scope of the following claims.

What is claimed is:

1. A method comprising:
    causing at least one access terminal that is configured to transmit data to a radio node in a sector of a radio access network to alter transmission;
    while transmission is altered, determining a measured power of a signal received at the radio node;
    updating an average value of signal power using the measured power; and
    generating an alarm on a management system of a network operator of the radio access network based at least in part on the updated average value.

2. The method of claim 1 wherein the alarm is generated based at least in part on the relationship between the updated average value and a threshold value.

3. The method of claim 2 wherein the threshold value comprises a sum of a configurable value and a value that is a floor of a noise level.

4. The method of claim 3 wherein the value that is the floor of the noise level is based on parameters associated with operation of the radio node.

5. The method of claim 1, wherein the alarm informs the network operator that interference is present in one or more sectors of the radio access network.

6. The method of claim 5, wherein the transmission is altered for a predefined period of time each time it is altered.

7. The method of claim 5, wherein the average value comprises an average of measured powers measured during previous intervals.

8. The method of claim 1, wherein the transmission is altered at intervals.

9. The method of claim 1, wherein the transmission is altered by stopping the transmission.

10. A memory comprising instructions that are executable by one or more network devices of a radio access network to:
    cause access terminals configured to transmit data to a radio node in a sector of a radio access network to alter transmission;
    while transmission is altered, determine a measured power of a signal received at the radio node;
    update an average value of signal power using the measured power; and
    generate an alarm on a management system of a network operator of the radio access network based at least in part on the updated average value.

11. The memory of claim 10, wherein the alarm is generated based at least in part on a relationship between the updated average value and a threshold value.

12. The memory of claim 11, wherein the threshold value comprises a sum of a configurable value and a value that is a floor of a noise level.

13. The memory of claim 12, wherein the value that is the floor of the noise level is based on parameters associated with operation of the radio node.

14. The memory of claim 10, wherein the alarm informs a network operator that interference is present in one or more sectors of the radio access network.

15. The memory of claim 10, wherein the transmission is altered at intervals.

16. The memory of claim 15, wherein the average value comprises an average of measured powers measured during previous intervals.

17. The memory of claim 10, wherein the transmission is altered by stopping transmission.

18. The memory of claim 10, wherein the transmission is altered for a predefined period of time each time it is altered.

* * * * *